United States Patent
Moeller

(10) Patent No.: US 11,038,681 B2
(45) Date of Patent: Jun. 15, 2021

(54) USING BLOCKCHAIN TO TRACK INFORMATION FOR DEVICES ON A NETWORK

(71) Applicant: MyOmega Systems GmbH, Nuremberg (DE)

(72) Inventor: Bernd Moeller, Henfenfeld (DE)

(73) Assignee: MyOmega Systems GmbH, Nuremberg (DE)

(*) Notice: Subject to any disclaimer, the term of this patent is extended or adjusted under 35 U.S.C. 154(b) by 0 days.

(21) Appl. No.: 16/793,246

(22) Filed: Feb. 18, 2020

(65) Prior Publication Data

US 2020/0186332 A1    Jun. 11, 2020

Related U.S. Application Data

(63) Continuation-in-part of application No. 15/907,500, filed on Feb. 28, 2018, now Pat. No. 10,608,910.

(60) Provisional application No. 62/524,807, filed on Jun. 26, 2017.

(51) Int. Cl.
| | | |
|---|---|---|
| *H04L 9/32* | (2006.01) | |
| *H04L 9/08* | (2006.01) | |
| *H04L 9/30* | (2006.01) | |

(52) U.S. Cl.
CPC ............... *H04L 9/088* (2013.01); *H04L 9/30* (2013.01); *H04L 9/3236* (2013.01)

(58) Field of Classification Search
None
See application file for complete search history.

(56) References Cited

U.S. PATENT DOCUMENTS

| | | |
|---|---|---|
| 2017/0033932 A1 | 2/2017 | Truu et al. |
| 2017/0046638 A1 | 2/2017 | Chan et al. |

(Continued)

FOREIGN PATENT DOCUMENTS

| | | |
|---|---|---|
| CN | 108292396 A | 7/2018 |
| WO | WO 2017/027648 A1 | 2/2017 |

OTHER PUBLICATIONS

Ali Dorri, et al., "Blockchain for IoT Security and Privacy: The Case Study of a Smart Home," $2^{nd}$, IEEE PERCOM Workshop On Security Privacy And Trust In The Internet of Things, Mar. 13, 2017, XP033092358.

*Primary Examiner* — Brian Whipple
(74) *Attorney, Agent, or Firm* — Muirhead and Saturnelli, LLC

(57) ABSTRACT

Efficiently and reliably tracking information for devices in a network, for example, a heterogeneous network of a plurality of devices of different types, includes collecting and storing information in a computationally efficient and secure manner that ensures to a high degree of certainty the integrity of the information for future access and use. The information may be collected from one or more sensors/data sources, for example, over a predetermined period of time, and may be grouped into a single transaction record. The transaction record may be sent from a gateway to a server of a network cloud, for example, during a predefined time slot of cycle based in part on the number of gateways and sensors in the system. Each transaction record may include a one-way hash of, and a reference to, an immediately preceding transaction record for the overall system for which information is being tracked.

20 Claims, 9 Drawing Sheets

(56) References Cited

U.S. PATENT DOCUMENTS

2018/0139057 A1* 5/2018 Truu .................. H04L 9/30
2020/0244464 A1* 7/2020 McLean ............ H04L 9/3247

* cited by examiner

USING BLOCKCHAIN TO TRACK INFORMATION FOR DEVICES ON A NETWORK

CROSS-REFERENCE TO RELATED APPLICATION

This application claims priority to U.S. provisional patent application No. 62/524,807 filed on Jun. 26, 2017 titled "BLOCK-CHAIN", which is incorporated by reference herein.

TECHNICAL FIELD

This application is directed to the field of device monitoring and management and more particularly to the field of maintaining information for devices.

BACKGROUND OF THE INVENTION

Product "food" chains exist for many businesses for the lifecycle of a product/machine from its manufacture through its use and maintenance until its end of life. S-I-P-D-U-O or SIPDUO is one example of a model of such a food chain, in which a Supplier S delivers a part of a device (e.g., machine) to an integrator I. I integrates a sub-system of the device and delivers to a producer P. P produces the device and sells it to a dealer D. The dealer installs the device at the user, U, who operates the device. In some cases, an operator O is needed to collect data from hundreds of devices, or even more. However, one or more of the SIPDUO parties might consider at least some part of this data to be its own. For example, a supplier S wants access to data that the Supplier believes to be its own, but one or more of the other parties might block this attempt. In another case, a user U may desire, or believe the user has the exclusive rights to all data for the device. Or perhaps the operator O is responsible for handling the data and desires statistics on the data, for example, to meet Service Level (SL) objectives or requirements, but cannot access it.

Furthermore, in devices including a plurality of sub-components, for example machines including a plurality of parts, it is often difficult to reliably track the state of the various sub-components and/or to manage them. This inability to reliably track state information can make it difficult to determine the cause of a performance issue or failure of a sub-component of the device of which it is a part, for example, to determine the party that caused a problem and when (e.g., during the manufacture or use) the problem was caused. Even if information is tracked throughout the manufacturing, transport, installation and use of a device, such information may be susceptible to future manipulation, making such information inherently unreliable. Not only does this unreliability make it difficult to determine the source of problems within devices, it makes it more difficult to effectively manage the devices.

Accordingly, it is desirable to provide a mechanism to reliably track and maintain data for components of systems in instances where components are provided and integrated by different, often unrelated, suppliers. It also is desirable to enable parties, for example, parties of a product food chain, to reliably engage in transactions involving such data, for example, sharing and/or trading such data, either informally or on a contractual basis, e.g., as part of a license or sale.

SUMMARY OF THE INVENTION

According to the system described herein, tracking information about a plurality of devices in a network includes receiving, at a first gateway, a plurality of communications, each communication including information indicating a state of one of the plurality of devices, grouping, on the first gateway, the information from two or more of the plurality of communications into a single transaction record, the transaction record including a hash of an immediately preceding transaction record for the network, and sending the single transaction record from the first gateway to the server. The transaction record may be a transaction block of a blockchain. Tracking information about a plurality of devices in a network may also include submitting a transaction record transmission request to the server and receiving the hash of the immediately preceding transaction record in response to the submission, wherein the single transaction record is sent in response to receiving the hash. Grouping the information may also include grouping information only from communications of the plurality of communications that represent a change in state of one of the plurality of devices. Sending may include sending the single transaction record according to a predefined schedule. Information regarding the predefined schedule may be included in the transaction record sent to the server. The network may include a plurality of gateways including the first gateway and each gateway may send one or more transaction records during a predetermined time slot within a given cycle. Tracking information about a plurality of devices in a network may also include maintaining a schedule defining the cycle and a plurality of time slots within the cycle for the plurality of gateways. For each time slot, only information indicating a changed state of one of the plurality of devices may be stored on the server. Once per cycle, information included in the one or more transaction records sent by the plurality of gateways may be recorded at the server, independent of whether the information represents a changed state of a device. The single transaction record may include one or more portions of information, each portion of information corresponding to information included in one of the communications received at the first gateway indicating the state of one of the plurality of devices and at least a first portion of the one or more portions may include information encrypted with a security credential of the corresponding physical device. The first portion may include information that is not encrypted. The gateway may include a trusted platform module to encrypt at least a portion of the single transaction record. The single transaction record may have a record body and a record header, the record body including the grouped information, and the record header including the hash of the immediately preceding transaction record. Tracking information about a plurality of devices in a network may also include storing the single transaction record on the gateway. Tracking information about a plurality of devices in a network may also include determining changes in state to one or more devices on the network by submitting a request to the server for one or more transaction records of the record chain. The network may include a plurality of gateways including the first gateway, and, except for a header of a transaction record representing an immediately preceding transaction record, the first gateway may only receive headers of transaction records created by others of the plurality of gateways by submitting requests to the server. The plurality of communications may be received on secure communication channels and the single transaction record may be sent on a secure communication channel. The single transaction record may be sent in a communication in which the single transaction record is encrypted using TLS. Tracking information about a plurality of devices in a network may also include the server storing the single transaction record as part of a record chain on one or more storage media. The record chain may represent a transaction register of all transactions corresponding to the plurality of gateways on the network. Tracking information about a plurality of devices in a network may also include sending a transaction record indicative of a state of one of the plurality of devices directly from the one device or a sensor corresponding to the one device to the server. Tracking information about a plurality of devices in a network may also include using the single transaction record to implement a smart contract.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

Figure 1:
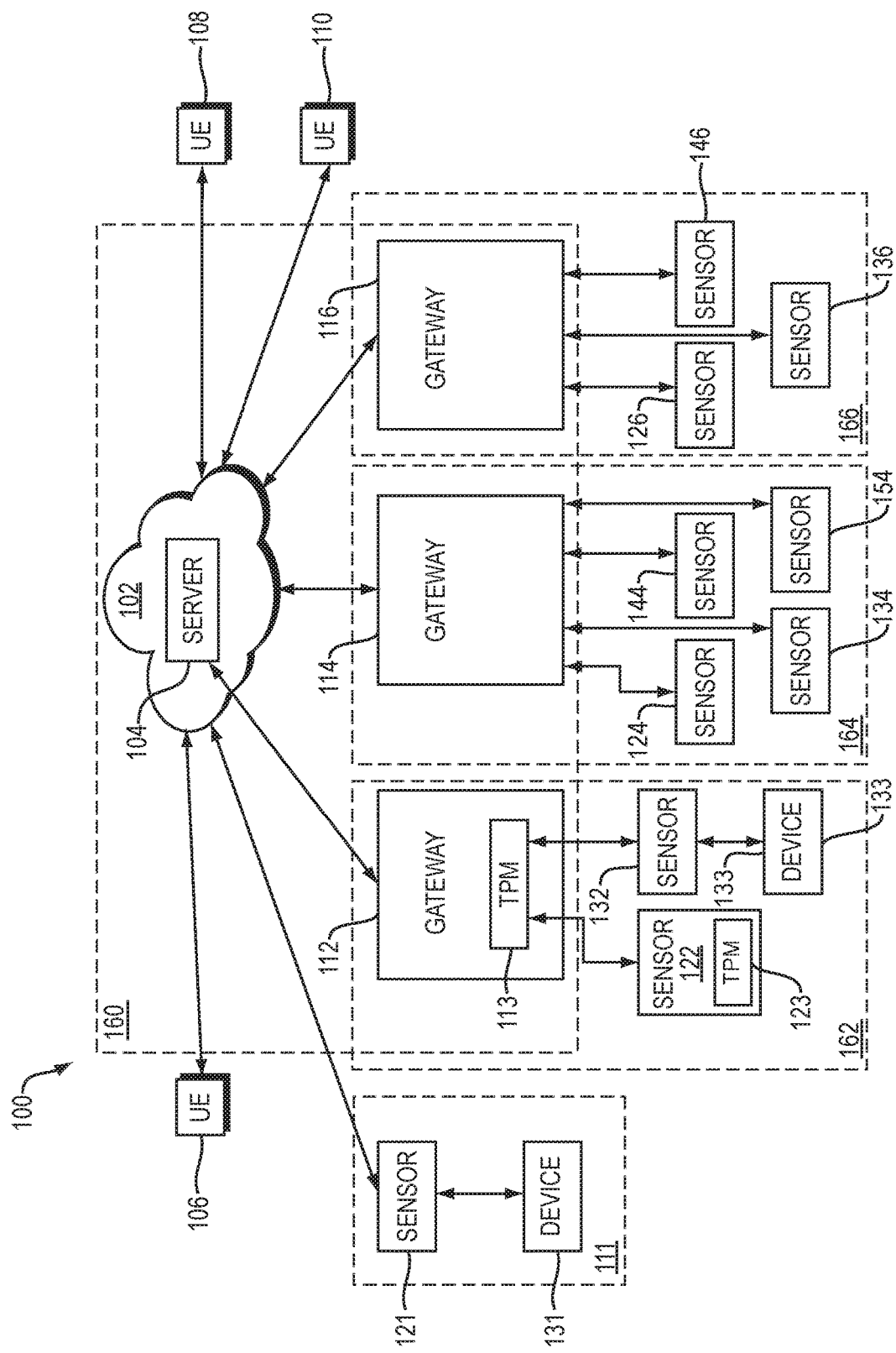
FIG. 1 is a block diagram illustrating an example of a system for efficiently and reliably tracking device information on a network according to embodiments of the system described herein.

The system described herein may be used to efficiently and reliably track information about devices on a network, for example a heterogeneous network of a plurality of devices of different types, for example, from different manufacturers/component integrators. The information may be collected and stored in a computationally efficient and secure manner that ensures to a high degree of certainty the integrity of the information for future access and use. For devices including a plurality of sub-components, for example, machines including a plurality of parts, the ability to reliably track the state of the various sub-components helps determine the cause of a performance issue or failure of a sub-component or the device of which it is a part, for example, to determine the party that caused the problem and when the party caused the problem. The ability to reliably track device data also helps manage devices.

In some embodiments, information may be collected from one or more sensors/data sources, for example, over a predetermined period of time, and may be grouped into a single transaction record. The transaction record may be sent from a gateway to a server (e.g., residing within a network cloud). Each transaction record may include a one-way hash of, and a reference (e.g., link or pointer) to, an immediately preceding transaction record for the overall system (e.g., network) for which information is being tracked. A hash of a transaction record is the output of a mathematical function, algorithm or transformation (hereinafter "hash function") applied to the transaction record. The hash function may be configured to produce a hash value that can be represented by a data structure (e.g., a string) of uniform size or range of sizes. In some embodiments of the system described herein, the hash is a one-way hash in that the hash function that produced the hash value (hereinafter a "cryptographic hash function") is infeasible to invert. By making the one-way hash part of the next (i.e., current) transaction record, it can be determined if an immediately preceding record has been altered because the one-way hash generated from the altered transaction record will not match what is stored in the next transaction in the chain. Furthermore, in embodiments of the system described herein, each transaction record includes a one-way hash of, and a reference (e.g., link or pointer) to an immediately preceding transaction record, forming a continuingly growing temporal list of records referred to herein as a record chain. Altering any transaction record in the record chain will have a cascading effect changing the expected one-way hash of every future transaction record, such that the source altered record can be determined. Thus, using a one-way hash function enables, along with other features described herein, reliable tracking of device information in a system. Any of a variety of cryptographic hash functions may be used, for example, MD4, MD5, SHA-1 and SHA-2.

In some embodiments, a record chain may be implemented using a blockchain, each transaction record of the record chain being implemented using a transaction block of the blockchain (also known as a block-chain or block chain). A blockchain is a continuously growing list of records, called blocks, which are linked and secured using cryptography. Each block contains transaction data or information, and may contain a hash pointer as a link to a previous block (i.e., an immediately preceding block in the chain), and a time stamp. By design, blockchains are inherently resistant to modification of the data. Blockchains are an open, distributed ledger that can record transactions between two parties efficiently and in a verifiable and permanent way. For use as a distributed ledger, a blockchain may be managed by a peer-to-peer network collectively adhering to a protocol for validating new blocks. Once recorded, the data in any given block cannot be altered retroactively without the alteration of all subsequent blocks, which requires collusion of the network majority. Blockchains are considered secure by design and may be considered an example of a distributed computing system with high Byzantine fault tolerance. Although various embodiments of the system described herein use blockchains, the invention is not so limited. Other appropriate technologies may be employed to record transactions herein or to implement a record chain, where such technologies are inherently resistant to modification of the data and can record data in a verifiable and permanent way that preserves temporal relationships between the data blocks so that, for example deletion/removal of any block(s) in the chain may be detected. Once the data is recorded in any block, such data cannot be altered retroactively without the alteration of all subsequent blocks in the block-chain. The terms "data" and "information" are used interchangeably herein, unless otherwise specifically noted.

The information recorded in a transaction record may include information specific to, or owned by, various parties within a food chain corresponding to a device, for example, suppliers, integrators, producers, dealers, users and operators. The information in the transaction record may include private data that may be encrypted using a private key specific to a device, and may include public data that is not encrypted. The public data may also be encrypted to protect the value of this data and to enable the trading of the data, for example, as part of a smart contract. The distinction between public data and private data may be a matter of degree. For example, both public data and private data may be proprietary to a party, but the private data may be deemed more sensitive, e.g., more of a secret, and thus protected as such. For example, the public data may be basic specifications associated with a product or product part, which a party is willing to share with any customer or potential customer, whereas the private data is data the party may be data the party is only willing to share with a technology or business partner, for example, for a payment or license fee. Accordingly, public data may not be encrypted at all, enabling any party given access to the transaction record access to the public, or may be encrypted using a different credential (e.g., key) than the private data, so that a party can be more selective in enabling access to the private data; i.e., only give credentials associated with the private data to parties to certain contracts. Encrypted data, whether public or private, may be accessible only to those parties having a key corresponding to the private key, for example, the private key itself in the case in which symmetric cryptography is employed, or a corresponding public key in a case in which asymmetric public key cryptography is employed. In this manner, parties owning information corresponding to a device may make some portions of the information public and other portions private to only select parties, for example, according to a smart contract, as described below in more detail.

In some embodiments of the system described herein, a gateway may send (e.g., transmit) the current state information for each device to a server as part of each transaction record, whereas, in other embodiments, the gateway only sends state information that has changed since a last transaction record was sent from the gateway to the server, thereby reducing consumption of network resources. Further, in some embodiments, a cycle/slot schedule is implemented, during which each gateway of a system transmits transaction records to a server during an assigned slot of a transaction cycle. In such embodiments, only changed information received in a transaction record during each timeslot from a gateway may be stored at the server, and once per cycle all transaction information received during the cycle—i.e., the cumulative transaction information received during the time slot—may be recorded on the server. By storing all full transaction information for a system only once per cycle, and only storing changed information for each transaction throughout the cycle, network resources, in particular storage resources, may be conserved.

In some embodiments, prior to sending a transaction record to the server, the gateway may submit a transaction transmission request to the server, and send the transaction record to the server only after receiving a response from the server. The response may include a hash of the immediately preceding record of the record chain. In some embodiments, aside from the hash of the immediately preceding record, a gateway only receives information about other transaction records of the overall system (e.g., blocks of the block chain) by submitting a request to the server. This is in contrast to an embodiment in which updates are sent to each gateway of a system each time a transaction record is sent from a gateway to the server. By receiving the hash of the immediately preceding block in response to requesting to send/transmit a block, the integrity of the record chain system can be maintained without the need for sending the aforementioned updates to each gateway, thereby reducing consumption of network resources, significantly in some embodiments.

In some embodiments, each transaction record includes a body and a header. The body may include the information obtained from the devices, e.g., private and/or public information described in more detail elsewhere herein. The header may include a hash of an immediately preceding transaction record of the record chain, and may have a reference (e.g., pointer or link) to such immediately preceding transaction record, which may be provided as part of the hash itself. The header also may contain a hash of the current transaction record itself, a time stamp and/or schedule information as described below in more detail.

In some embodiments of the system described herein, each gateway of the plurality of gateways of the system (as defined by the server and/or gateways) sends transaction records, and perhaps other information, according to a predetermined schedule. For example, each gateway may be allotted a predetermined time slot within a time cycle, during which the gateway can send a block and perhaps other information to the server. The time cycle is the temporal period during which information for all gateways in the system is processed; i.e., during which a transaction record for every gateway in the system is transmitted to the server. The temporal length of each time slot may be a function of the number of devices coupled to the gateway, or the amount of data to be transmitted, among other factors. In some embodiments, a length of every time slot is predefined to be the same, based on the longest time needed for any of the gateways among the gateways of the system, to ensure there is enough time to process the transaction records for each gateway during its allotted time slot. The length of a cycle in turn may be a function of the number of gateways, an estimated frequency of user-initiated information requests, and perhaps other factors. The length of the cycle time may be set to ensure that there is enough time to process transactions for all gateways of a system, taking into consideration the frequency of user requests and amount of time to process each user request. In an embodiment, the system may be configured to process each user request within the duration of a time slot. Each gateway may be configured with a timer function to determine when to initiate the transaction record transmission process (which as described in more detail herein may begin with submitting a transaction transmission request) based on the time slot of the gateway within the cycle. The gateway may include information relating to the predetermined schedule in each transaction record, for example, within the header of the transaction record, as described in more detail below.

The transaction chains may be stored on the server on the cloud as part of a transaction chain that is continually updated as described herein. The transaction chain may serve as a register that records transactions within a system efficiently and in a verifiable and permanent way. Any of the parties to the system may collect information about devices, and share portions of the information as public or private with others, and have access to public and private information of others concerning devices of the system.

The transaction chains may serve as audit trails for devices within a system. For example, a machine installed at a factory may include several parts, many of these parts themselves comprised of other parts. Several different parties (supplier, integrator, dealer, etc.) may have come into contact with each part during the lifecycle of the machine, including manufacturing, transport, installation and use. The state of each part throughout the lifecycle of each part may be monitored and reliably tracked using the system and methodologies described herein. The addition, removal and replacement of parts may be tracked using transaction chains as well. The tracking provided by transaction chains may be considered reliable because the integrity of the information is maintained such that the source and timing of a modification to any of the information (and improper modifications) may be reliably determined.

The reliability of transaction chains may be increased using Trusted Platform Module cryptographic chips (TPMs), which may be certified by state authorities according to the Common Criteria Evaluation of Security Functions such as the Federal Office for Security in the Information Technology (SI) for Germany. Such TPMs may be used inside various devices, for example, as described below in relation to FIG. 1. The reliability of the transaction chain may be increased by implementing a distributed architecture, for example, through the use of determined cycle/slot structures, for example, as described below in relation to FIG. 8, and by using information exchange patterns that support a distributed decentralized computing of the transaction chain, for example, as described in relation to FIG. 7.

Furthermore, if the machine or a sub-component thereof is subsequently sold, leased or otherwise made part of a contractual transaction, transaction chains may be used as part of contractual transaction between the parties. For example, the purchase or lease may include the seller providing the buyer access to and/or control of the transaction chain of the machine.

Going forward from the time of the transaction, the buyer may continue to grow the transaction chain, and at later date provide access to or control of the chain to a future buyer or the like. In some embodiments, the contractual transaction itself is implemented using transaction chains (e.g., blockchains) as described herein. That is, a transaction chain can be used to implement a "smart contract" between parties, for example, by defining the rules (i.e., terms) of the contract (including payment terms, access to information, timing, etc.), enforcing the rules of the contract, and recording the execution of the contract and/or transactions under the contract as transaction records of a transaction chain. For example, a transaction chain may define a license scheme (e.g., one-time fee, installment payments, pay-per-use, etc.) involving a system of devices, or subcomponents (e.g., parts) thereof as described herein, and record transactions under such a contract as transaction records of a transaction chain. In some cases, the smart contract may define the rules for the exchange of information related to a system or sub-component thereof.

Such smart contracts may define rules governing the exchange of public and private data/information as described herein, and record the results of a transaction in relation to same. For example, a smart contract may define the rules by which a first party, e.g., an integrator, is allowed access to public or private information of a supplier, e.g., the proprietary specification for a particular system or part thereof, in exchange for public or private information of the integrator for a particular system or part thereof, or perhaps in exchange for currency, e.g., bitcoins, or another asset. Proprietary information may include, for example, internal designs, proprietary interfaces, benchmarking results, other test data, manufacturing reliability data, customer lists, price lists, source code, etc. A smart contract may be defined to provide a party to the contract one or more keys (e.g., a private and/or public encryption keys) or other credential that provides access to encrypted public or private information, for example, in response to a payment made by the party, performance of an action, or in exchange for some other form of consideration.

FIG. 1 is a block diagram illustrating an example of a system 100 for efficiently and reliably tracking device information on a network according to some embodiments of the system described herein. Other embodiments of a system for efficiently and reliably tracking device information on a network, for example, variations of system 100, are possible and are intended to fall within the scope of the invention. As is described in more detail elsewhere herein, various aspects of the system 100 and embodiments of the system described herein may be implemented using aspects of the system described in U.S. Pat. No. 9,509,628 titled "Managing Devices in a Heterogeneous Network," issued Nov. 29, 2016, to Bernd Moeller (hereinafter the '628 patent), the entire contents of which are hereby incorporated by reference.

The system 100 may include any of: a network 102, a server 104, gateways 112, 114, 116, user equipment 106, 108, 110; data sources 121, 122, 132, 124, 134, 144, 154, 126, 136, 146 (e.g., sensors), other components, or any suitable combination of the foregoing.

The server 104 may be part of the network 102, which may be, for example, a cloud network such as a public or private cloud. While the server 104 is shown as a single component, it should be appreciated that the server 104 may represent a distributed server system, consistent with network cloud principles. Thus, the server 104 may include a plurality of physically separate/remote components (e.g., a server cluster) or portions of such components. Furthermore, while only one server is shown in FIG. 1, the invention is not so limited, as tens, hundreds, thousands, or even more servers may be included in the system 100.

Each data source may be any of a variety of components or types of sensors, for example, any of those made available by MyOmega Systems GmbH having offices in Nuremberg, Germany, (hereinafter "MyOmega") and may be configured to sense, capture or determine any of a variety of physical, electromechanical or other properties, information, parameter value or state, including but not limited to: temperature, infrared radiation or temperature arrays, light intensity, images, color, humidity, pressure, strain, wear, voltage, current, weight, mass, size, height, location, distance, speed, space consumption, power consumption, network frequencies, rounds per revolution, stream of air, volumes, localization, network cell identification, ultrasonic reflection values, time of flight and other distance measures, tag IDs and RFID parameters, mechanical vibrations, sound, deflected magnetic fields in particular the magnetic field of the earth, resource consumption, consumption rate, on, off, low, high, damage, inoperability, reduction, other properties, information, parameter values or state, or any suitable combination of the foregoing.

Although not illustrated in FIG. 1, each data source may be embedded within or otherwise coupled (physically, optically, electromagnetically or otherwise) to a device for which the data source captures and communicates information. For example, the data source 132 may be coupled to a monitored device 133, such as a storage bin, where the data source 132 is a TracoBin® sensor made available by MyOmega. Alternatively, the data source 132 may be a sensor embedded within a device 135 for which the data source 132 captures state information. In embodiments in which a sensor is embedded within a device or is an integral part of the device, the device and sensor may be considered one and the same. A device may be considered coupled or connected to a gateway herein when the device itself, or possibly a sensor embedded within the device, is communicatively coupled with the gateway, or when a sensor coupled to the device and detecting information therefrom is communicatively coupled with the gateway. Thus, although embodiments herein may describe that a device (e.g., the device 133) communicates information about the device to a gateway (e.g., the gateway 112), it should be understood that this also could mean that a sensor (e.g., the data source 132) coupled to the device (e.g., the device 133) is communicating information to the gateway (e.g., the gateway 112).

A device to which a sensor is coupled, or embedded or integrated within, may be any of a variety of types of devices, including, but not limited to a: computer, machine, equipment, appliance, circuit, container, barrel, tank, IBC (intermediate bulk container), tool, tap, cutting tool, drill or milling, weapon, toy, other type of device, a sub-component or part of any of the foregoing or of a more complex system such as, for example, a vehicle, factory, industrial plant, building, house, network (power grid, communications, computer, traffic, other), warehouse, store, mall, data center, control system, or other complex systems, or suitable combination of any of the foregoing. It should be appreciated that one or more devices may be capillary devices. Information about each device may be communicated by a sensor to a gateway periodically, in response to an event and/or in response to user request/input. Further, over time, a sensor may alter the manner in which information is communicated, for example, between cellular, wired, wireless, capillary communication, other techniques, or any suitable combination of the foregoing.

Each data source/sensor may include a TPM (e.g., a TPM 123 of the device 122), one or more Secure Elements, a Subscriber Identification Module (SIM), Crpyto Blocks, other data security components and/or any suitable combination of the foregoing. Although the term TPM is used throughout herein, it should be appreciated that any of the foregoing security/cryptographic components or combinations thereof or similar components may be used to perform data security operations, including cryptographic operations, described herein. Further, TPMs may be included in, and employed by, other components of the system 100, for example, any of the UEs, gateways and the server, to perform one or more of the data security operations described herein. The operations may include encrypting device information, for example using a private key specific to the device, to preserve the privacy of the information. The private key may be a private key (e.g., shared secret) shared between parties of a symmetric cryptography scheme (e.g., one or more of the parties of a food chain described herein) or a private key of a private/public key pair of an asymmetric cryptography scheme. Any of the sensors may encrypt one or more portions of information included in communications sent to gateways 112, 114 and 116, or each gateway may encrypt portions of such information received unencrypted. It should be appreciated that, while only nine sensors are shown in FIG. 1, the invention is not so limited, as hundreds, thousands, millions or even more sensors may be included in system 100.

The gateways 112, 114, 116 may be coupled to the server 104, and each of the gateways 112, 114, 116 may be coupled to a plurality of devices as illustrated in FIG. 1. For example, the gateway 112 may be coupled to the devices 122, 132 and 133. The gateways couple the sensors/data sources to the cloud, and to the server 104 in particular; i.e., serve as a gateway to the cloud for the sensors/data sources. In some embodiments, one or more of the data sources/sensors may be connected directly to the cloud or to a server, for example as illustrated by a sensor 121 in FIG. 1, shown connected to a device 131 (e.g., a pump or fan). In such embodiments, the data source itself, or a sensor/device combination, may be treated like a gateway 111.

Figure 2:
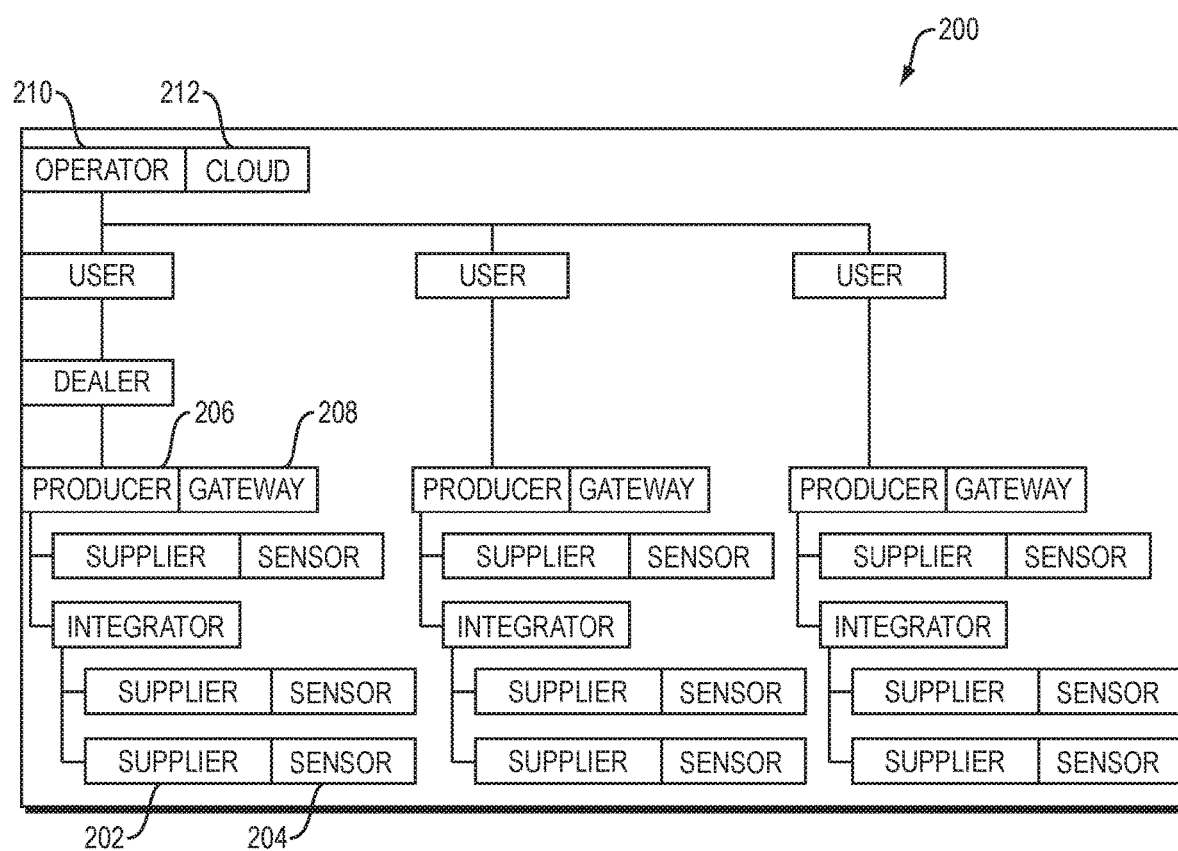
FIG. 2 illustrates an example of relationships between components of a system and parties/roles within a food chain according to embodiments of the system described herein.

Each gateway may be configured with one or more capabilities of the controller 52 of FIG. 1 of the '628 patent, including capabilities described in relation to FIG. 2 of the '628 patent. These embodiments may include those of the layer 88 described in relation to FIG. 2 of the '628 patent, and the mapping technique illustrated in FIG. 4 of the '628 patent, as well as the various collision management techniques described in relation to FIGS. 6-7 of the '628 patent. Each gateway may be any of a plurality of types of devices configured to perform the gateway functions defined herein, such as, for example, a general-purpose computer, a more specialized device such as an MYNXG® gateway or controller available from MyOmega, any of variety of other devices, or any suitable combination of the foregoing. It should be appreciated that, while only three gateways are shown in FIG. 1, the invention is not so limited, as hundreds, thousands, tens of thousands or even more gateways may be included in system 100. Each gateway may include a trusted platform module (TPM) (e.g., a TPM 113 of the gateway 112). As noted above, TPMs may be used to perform any of a variety of data security operations, including encrypting portions of communications from sensors to gateways, or encrypting portions of such information received at a gateway unencrypted. TPMs also may be employed for other data security operations used in various embodiments of the system described herein, including generating a one-way hash (or other type of hash) of a transaction record in accordance with embodiments described herein, or providing secure communications between elements components of the system 100, e.g., between the server, gateways and devices. For example, TPMs or other components of the system 100 may be configured to implement Transport Layer Security (TLS) for HTTPS communications and/or Datagram Transport Layer Security (DTLS) for Constrained Application Protocol (CoAP) communications, e.g., as described in the '628 patent. Furthermore, one or more security credentials associated with any of the foregoing data security operations may be stored on a TPM. The performance and security of the system described herein may be improved by sensors/data sources, gateways and servers using TPMs for these data security operations.

A TPM may be implemented within any of the gateways (e.g., the TPM 113), data sources or servers of system 100, for example, during production, and may be used to personalize the gateway or data source/sensor. Such gateways, data sources and/or servers may be configured (e.g., during manufacture or later) to implement a Public Key Infrastructure (PKI) for the management of keys and credentials. TPMs may create individual encrypted objects, which may be used to store transactions, for example transactions described below in relation to FIG. 3. In some embodiments, such TPM objects may be stored inside a non-volatile memory of sensors, gateways and/or servers, for example, during production of such devices, which may result in faster production cycles of such devices. Other cryptographic technologies may be used for the foregoing purposes as well.

A plurality of user devices/equipment (UEs) 106, 108, 110 may be any of a plurality of devices (e.g., desktop computers, laptop computers, tablets, personal digital assistants (PDAs), cellular smart phones or other devices) that enable a user to interact with other components (e.g., gateways, servers, sensors, monitored devices) of the system 100. Each UE may be configured with any of the functionality described in the '628 patent with respect to the UEs 54, 55, 56, including any UE functionality described in relation to FIGS. 2 and 3 of the '628 patent. In some embodiments, one or more gateways may be configured with UE functionality and/or one or more UEs may be configured with gateway functionality. It should be appreciated that, while three UEs are shown in FIG. 1, the invention is not so limited, as hundreds, thousands, tens of thousands or even more UEs may be included in the system 100.

In some embodiments, the system 100 may be considered to have one or more sub-systems that include one or more components of the system 100, which may be considered and referenced as systems herein. For example, combinations of the gateways 112, 114, 116 and the server 104 may be considered a system 160, and a gateway and sensors/data sources to which the gateway connects may be considered a system, for example, systems 162, 164, 166. Other combinations of the server, UEs, gateways and sensors/data sources may be treated as systems as well. Transaction chains (e.g., blockchains) used herein may be based on and defined for any system conceptualized for the system 100, for example, any of the systems described above. For example, a blockchain may be created and maintained for the system 162, or at the cloud/server level (e.g., the system 160). Such systems may be organized to align with parties of a food chain, as described in more detail elsewhere herein.

FIG. 2 is a conceptual model 200 illustrating an example of relationships between components of a system and parties/roles within a food chain according to embodiments of the system described herein. Other embodiments of relationships between components of a system and parties/roles within a food chain, for example, variations of the model 200 are possible and are intended to fall within the scope of the system described herein. As illustrated in FIG. 2, the role of a supplier may align with a sensor/data source as illustrated by components 202, 204; the role of a producer may align with a gateway, as illustrated by components 206, 208; and the role of an operator may align with a cloud (e.g., a server within the cloud), as illustrated by components 210, 212. The relationships between dealers, users and integrators and system components also are illustrated in FIG. 2.

Figure 3:
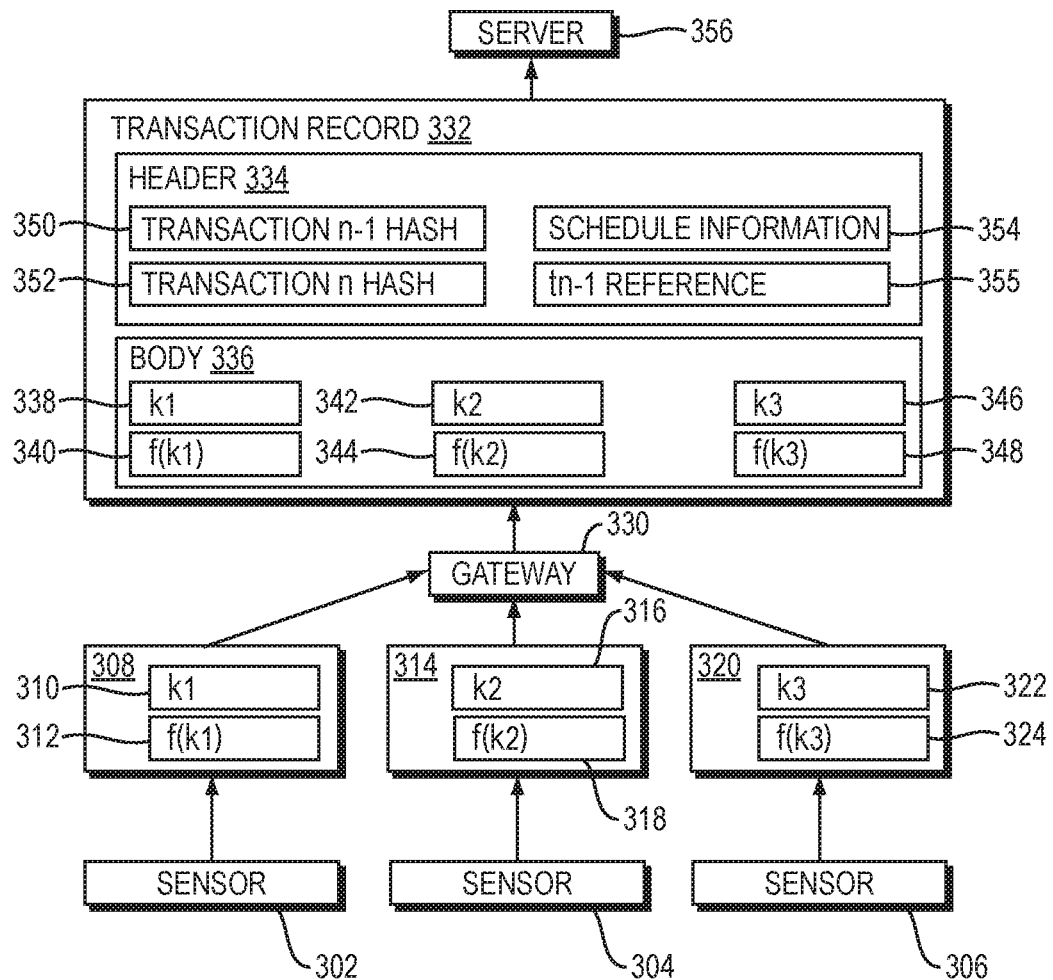
FIG. 3 is a block diagram illustrating an example of grouping information from a plurality of communications into a transaction record according to embodiments of the system described herein.

FIG. 3 is a block diagram illustrating an example of grouping information from a plurality of communications into a transaction record according to embodiments of the system described herein. Other groupings of communications into transaction records having different layouts, for example, variations of the grouping illustrated in FIG. 3, are possible and are intended to fall within the scope of the system described herein.

A plurality of sensors 302, 304, 306 may send (e.g., transmit) communications 308, 314, 320, respectively, to a gateway 330 (e.g., one of the gateways illustrated in connection with the system 100) concurrently or at different times, for example, in accordance with a predefined schedule, in response to an event (e.g., a change in state of a monitored property) or in response to user input (e.g., a data request). Each of the communications 308, 314, 320 may include public information elements 310, 316, 322, respectively, and private information elements 312, 318, 324, respectively, described in more detail elsewhere herein. The gateway 330 may generate a transaction record 332 and may send the transaction record 332 to a server 356. The transaction record 332 may include a transaction header 334 and a transaction body 336. The transaction body 336 may include public information elements 338, 342, 346 corresponding to the public information elements 310, 316, 322, respectively, and private information elements 340, 344, 348 corresponding to the private information elements 312, 318, 324, respectively.

The transaction header 332 may include a one-way hash 350 of an immediately preceding transaction record, $t_{n-1}$, a reference (e.g., link or pointer) 355 to the immediately preceding transaction record, $t_{n-1}$, a one-way hash 352 of a current transaction record, $t_n$, and schedule information 354. The one-way hash of $t_{n-1}$ may have been obtained from the server 356 in response to a request, or, in another embodiment, in an update from the server 356 in response to submission of another transaction record to the server 356, as described in more detail elsewhere herein. Generating the one-way hashes 350, 352, and the schedule information 354 is described in more detail elsewhere herein. Information included in the record transaction body 336 may include only information of a device that has changed since a last transaction. In some embodiments, information unchanged since a last transaction is included in the transaction record body 336, and there is a mechanism for indicating which information has changed.

Figure 9:
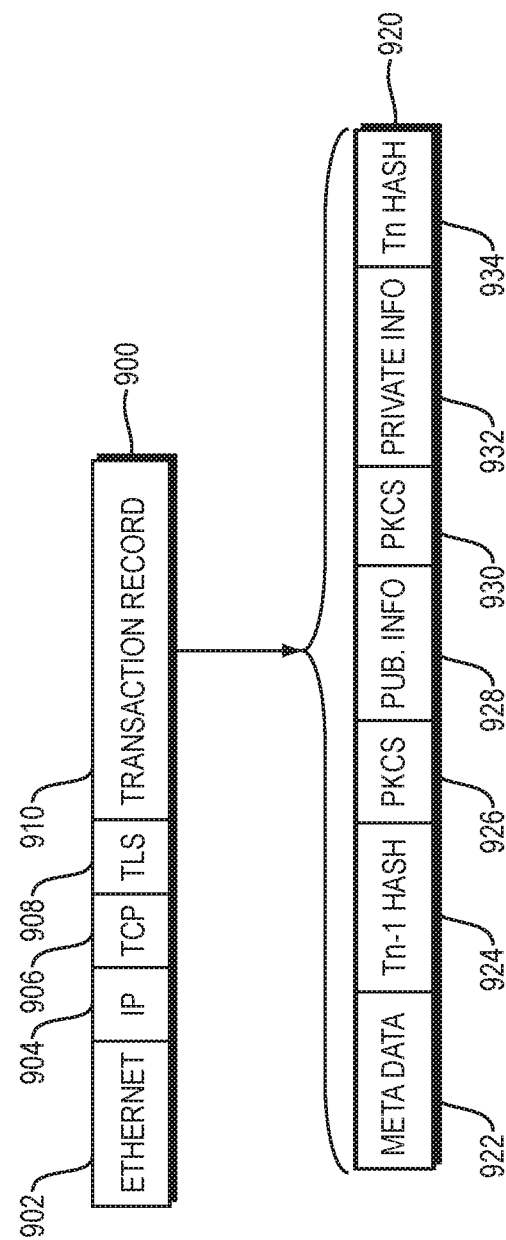
FIG. 9 is a block diagram illustrating an example of a message containing a transaction record according to embodiments of the invention described herein.

A transaction record may be transmitted in any of a variety of formats to the server 356 such as, for example, as described in relation to FIG. 9. FIG. 9 is a block diagram illustrating an example of a message 900 containing a transaction record 910, according to embodiments of the invention described herein. Other embodiments of a message, for example, variations of message 900, are possible and intended to fall within the scope of the invention. Message 900 may be formatted in accordance with the Ethernet, TCP/IP and TLS protocols, and thus may include an Ethernet header 902, a TCP header 906, an IP header 904 and a TLS certificate 908. It should be appreciated that other protocols may be used, in addition or as an alternative to the foregoing protocols, in which case additional or alternative fields may be included in the message 900. The transaction record 910 may be formatted in accordance with JSON. The transaction record may include one of more the fields described above in relation to the transaction record 332 of FIG. 3 and may be formatted as described above in relation to the transaction record 332, or may include different information and/or be formatted differently. For example, the transaction record 910 may be implemented as the transaction record 920. The transaction record may include any of: meta data 922, a hash of an immediately preceding transaction 924, a Public Key Cryptography Standards (PKCS) certificate 926, public information 928, another PKCS certificate 930, private information 932 and a hash of the transaction represented by the transaction record 920.

The meta data 922 may include any of a plurality of information, which may be used by a gateway or server, for example, the schedule information 354 described above in relation to FIG. 3, and may be encrypted, for example, with PKCS. The hashes 924 and 934 may be implemented as described above in relation to hashes 350 and 352 of FIG. 3. The public information 928 and private information 932 may be implemented as described above in relation to the public private information fields described above in relation of FIG. 3, and each may be encrypted in accordance with PKCS or another encryption technology, for example, Private Shared Key (PSK). PKCS certificates 926 and 930 may correspond to the PKCS-encrypted fields 928 and 932, respectively. Other encryption technologies may be used, in which case certificates corresponding to the encryption employed may be used in fields 926 and 930 instead of PKCS certificates.

The transaction records transmitted from gateways to servers (e.g., the transaction record 332) may be stored on the server as part of a transaction chain for the gateway, i.e., a transaction chain representing the system (e.g., the system 162 corresponding to the gateway 112). The server (e.g., the server 356) also may store the transaction record as part of a transaction chain corresponding to a system at the server/cloud level, for example, the system 160 corresponding to the server 104. That is, server 105 may a store a transaction chain that includes transaction records corresponding to gateways 112, 114 and 116.

Figure 4:
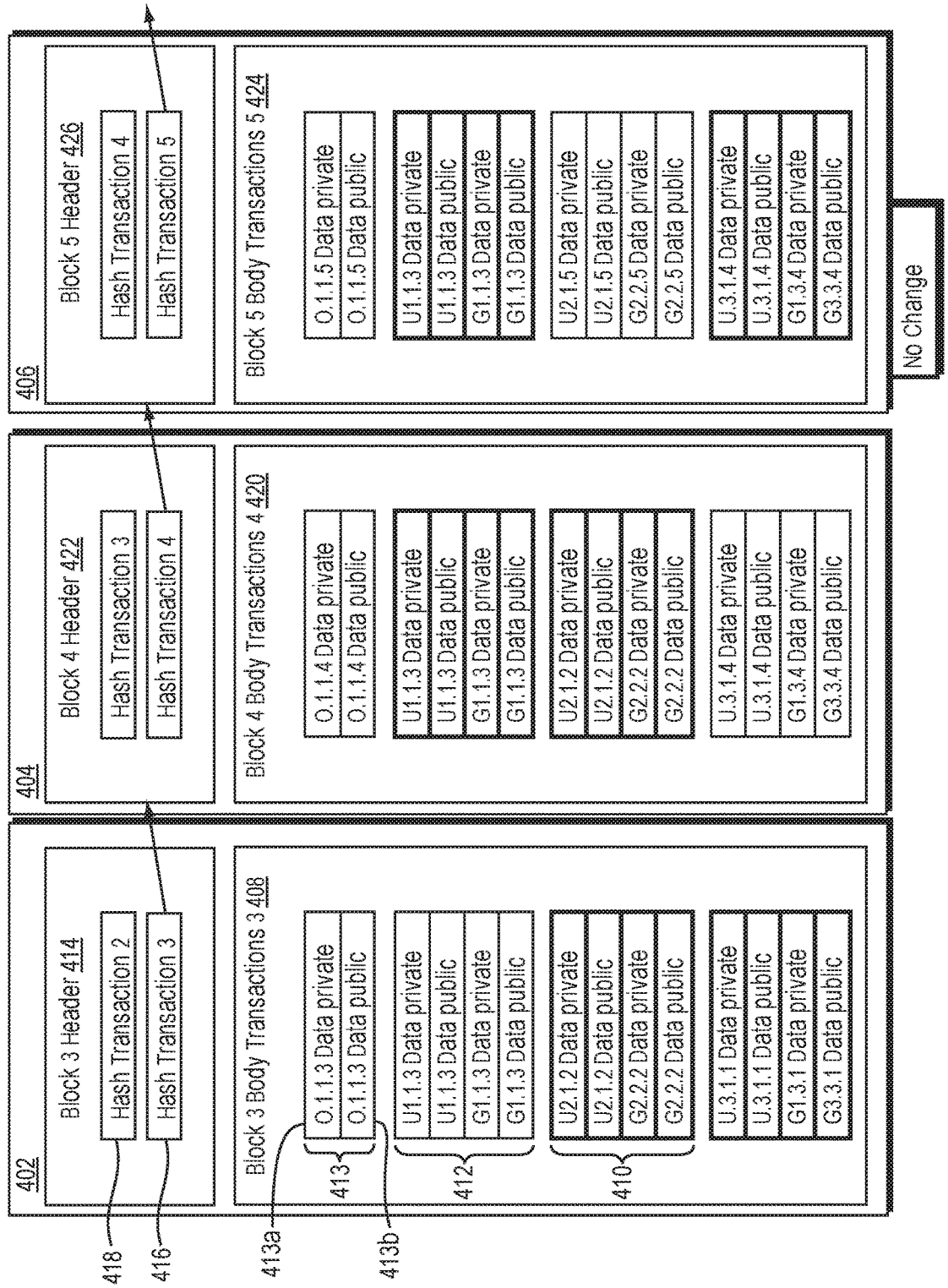
FIG. 4 illustrates an example of a plurality of transaction records according to embodiments of the system described herein.

FIG. 4 illustrates a plurality of transaction records 402, 404, 406 according to embodiments of the system described herein. Other embodiments of transaction records, for example, variations of the transaction records 402, 404, 406, are possible and are intended to fall within the scope of the system described herein. The transaction records 402, 404, 406 may include transaction record bodies 408, 420, 424, respectively, and record headers 414, 422, 426, respectively. Each header may include a one-way hash of an immediately preceding transaction record and a one-way hash of a current transaction record, for example, a one-way hash 418 of transaction record 2 and a one-way hash 416 of transaction record 3 of a header 414 of the transaction record 402. Each record body may include a plurality of public and/or private information. In the embodiment illustrated in FIG. 4, each private information element for a device has a corresponding public information element for the same device. For example, an information portion 413 includes a private information element 413a and a public information element 413b for the same device.

In the transaction record bodies 408, 420, 424, each information element may have a four-field identifier. One field identifies the owner of the information, e.g., Supplier, Integrator, Producer, User, or Operator. A supplier may correspond to a data source/sensor, a producer to gateway and an operator to a server. Another field is an identifier of the system to which the device belongs. For example, the device may be a cooling fan, and the system may be an appliance. Another field identifies a serial number of the device (possibly unique to each device), and another field represents an original transaction that provided the information for an element. For example, information elements 413a, 413b are owned by an Operator; for a device having a serial no. 1 that is part of system 1; and were originally provided by transaction 3.

In some embodiments, if an information element was originally provided by a transaction other than a current transaction, this means that the information represented by the information element has not changed for the current transaction. For example, information elements 410 were all originally provided by transaction 2, which is different than the transaction 3 represented by a record 402, meaning that information for devices U.2.1 and G.2.2 have not changed for transaction 3. For each information element, the transaction record body may include an indication of whether the information represented by the element has changed or not for the transaction represented. In FIG. 4, if the information represented by an information element has not changed (e.g., elements 410), the information element is highlighted in gray background with white lettering. In contrast to elements 410, elements 412 of transaction record 402 have changed, as reflected by the transaction for which these entries were originally provided (3) being equal to the transaction 3 of the transaction record. In some embodiments of the system described herein, only changed information is included in a transaction record.

The transaction records 402, 404, 406 may represent transaction records stored on a server as part of a transaction chain that serves as a transaction register for a system that includes multiple gateways, for example, system 160, which includes gateways 112, 114 and 116. For example, each of transaction records 402, 404, 406 may correspond to transaction records received from gateways G1, G3 and G2, respectively, as reflected in the information elements illustrated, which may be why information elements corresponding to the other gateways in each transaction are reflected as unchanged in each of the transaction records 402, 404, 406. For example, because transaction information in transaction record 406 corresponds to a transaction record received from gateway G2, information elements corresponding to gateways G1 and G3 are unchanged in the transaction 406—i.e., because transaction records from gateway G2 do not reflect any transactions corresponding to G1 and G3.

Figure 5:
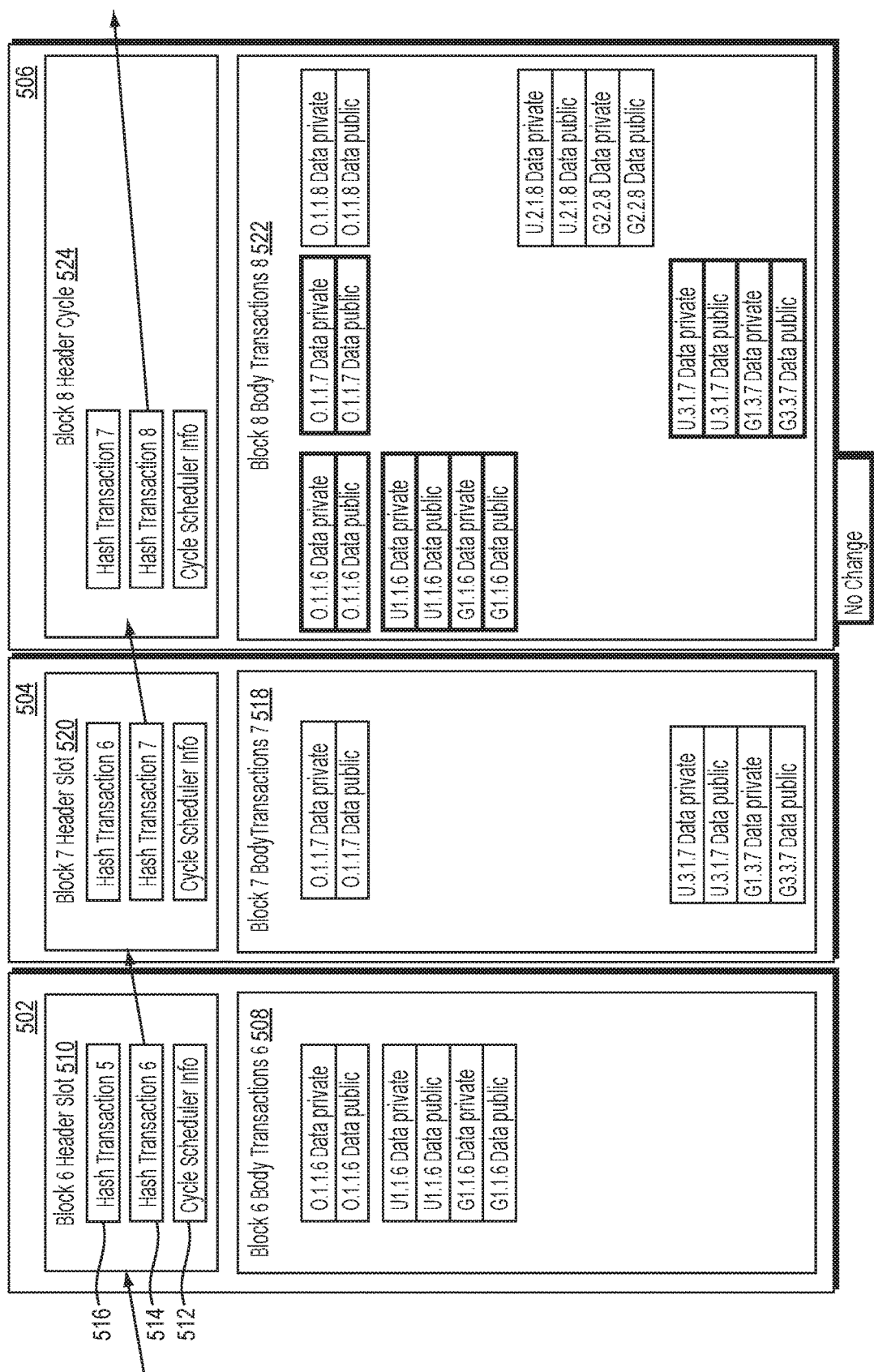
FIG. 5 illustrates an example of a plurality of transaction records according to embodiments of the system described herein.

In some embodiments, storing transaction information may be done in accordance with a slot/cycle scheduling technique described below in relation to FIG. 8, in which case the full transaction information for a given system during a cycle may be stored only once per cycle, whereas only information changed per transaction may be stored during respective time slots within the cycle. FIG. 5 illustrates an example of a plurality of transaction records 502, 504, 506 in which transaction information is stored in accordance with the slot/cycle scheduling technique described below in more detail in relation to FIG. 8, according to embodiments of the system described herein. Other embodiments of transaction records, for example, variations of the transaction records 502, 504, 506, are possible and are intended to fall within the scope of the system described herein. The transaction records 502, 504, 506 may include record bodies 508, 518, 522, respectively, and record headers 510, 520, 524, respectively. Each header may include a one-way hash of an immediately preceding transaction record and a one-way hash of a current transaction record, for example, a one-way hash 516 of transaction record 5 and a one-way hash 514 of transaction record 6 of the header 510 of the transaction record 502. Each record header also may include schedule information (e.g., cycle scheduler info) for the system.

Like transaction records 402, 404, 406, transaction records 502, 504 and 506 may represent transaction records stored on a server as part of a transaction chain that serves as a transaction register for a system that includes multiple gateways, for example, system 160, which includes gateways 112, 114 and 116. However, unlike the transaction records 402, 404, 406 of FIG. 4, the transaction records 502, 504 do not include information elements for information that has not changed for the transaction represented, but rather only include information that has changed for the transaction. For example, transaction 502 may correspond to a gateway G1, such that only information corresponding to G1 is shown as having changed. Similarly, transaction 504 may correspond to a gateway G3, such that only information corresponding to G3 is shown as having changed. The transaction record 506, on the other hand, may represent all transaction information included in any transaction record received from a gateway of a system during a cycle, whether changed or unchanged. Such a record may represent a concatenation of all of the transaction information received during the cycle, where only information elements that changed as a of a last transaction (e.g., slot) of the cycle are reflected as changed in the transaction record 506; i.e., information elements corresponding to the gateway G2. By storing all full transaction information for a system only once per cycle, and only storing changed information for each transaction throughout the cycle, network resources may be conserved, as compared to storing information for all devices of a gateway every transaction. This conservation of network resources, in particular storage resources, becomes more significant as the number of devices on the system increases.

It should be appreciated that separate transaction chains, e.g., transaction registers, may be maintained for each system within a system, for example, for each gateway, or even each data source, or groups of gateways and/or data sources defined as a system. Such transaction chains may be stored on any of the plurality of components of a system, for example, any of the components of system 100 described above in relation to FIG. 1. For example, server 104 may store, or control storage of, a plurality of transaction chains, e.g., a transaction chain for each of systems 162, 164 and 166, corresponding to gateways 112, 114 and 116, respectively, and a transaction chain for system 160, corresponding to a group of gateways 112, 114 and 116.

Figure 6:
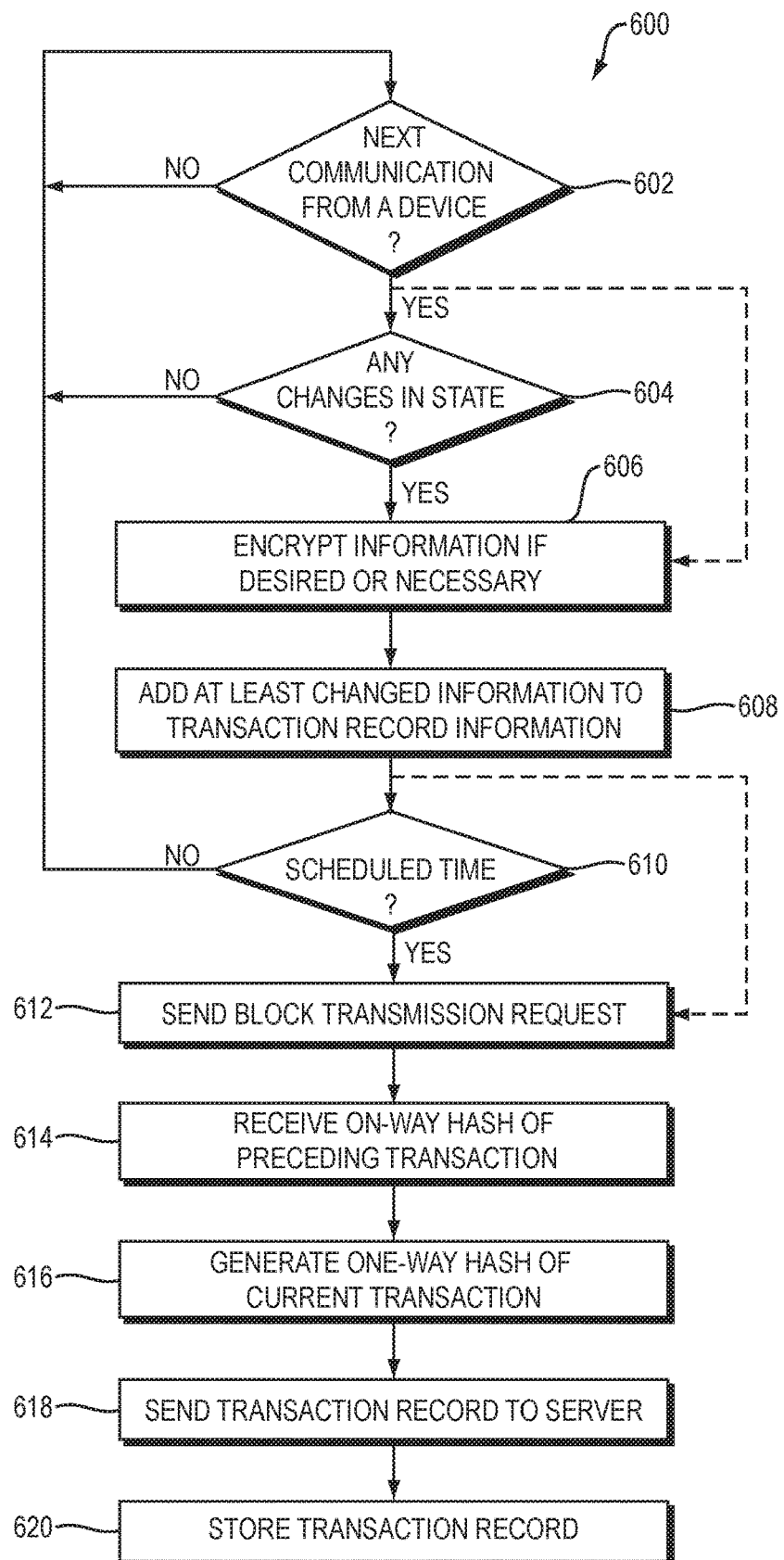
FIG. 6 is a flow chart illustrating an example of a method of efficiently and reliably tracking device information on a network according to embodiments of the system described herein.

FIG. 6 is a flow chart 600 illustrating an example of efficiently and reliably tracking device information on a network according to embodiments of the system described herein. Other embodiments of a method of efficiently and reliably tracking device information on a network are possible and are intended to fall within the scope of the system described herein. Processing illustrated by the flow chart 600 may be performed by one of more gateways of a network or system, for example, any of the gateways 112, 114, 116 of the network 100.

Processing begins at a step 602, where it may be determined whether a next communication from a device has been received, for example, by any of the devices coupled to a gateway. If a next communication has not been received, control returns to the step 602. This loop may be repeated until a next communication from a device is received, in response to which processing proceeds to a step 604 where it is determined whether the communication from the device reflects any changes to a state of the device—i.e., a change to any information about the device. If not, control transfers back to the step 602 for another iteration. Otherwise, control transfers from the step 604 to a step 606. In an alternative embodiment, if a next communication has been received at the step 602, control transfers from the step 602 directly to the step 606, thus skipping the test step 604. The test step 604 may be performed in embodiments in which it is desirable to note only changes (state changes) to any information of a device. For example, in some embodiments, only changed information may be included in a transaction record sent to the server, or only changed information may be saved on the server and/or gateway. In embodiments in which it not desirable to determine only changes in information (state), the step 604 may be omitted. Note also that the step 604 also may be omitted in embodiments in which devices only send communications when information has changed, i.e., when a sensor/data source indicates that information has changed. In such embodiments, since only changed information is sent, the test step 604 is not necessary.

At the step 606, at least some of the information included in the communication may be encrypted. For example, encryption of private information, as described elsewhere herein, may be performed, for example using a TPM included in the gateway, or by another mechanism. In some embodiments, performing encryption may not be necessary, as the private information may have been encrypted already on the device or a sensor corresponding thereto prior to sending the communication to the gateway. Thus, although not illustrated in FIG. 6, it is possible for a sensor or device to encrypt private data prior to sending a communication to a gateway, for example using a private key corresponding to the device, as described elsewhere herein. To the extent any encryption is to be performed at the step 606, the encrypting may be limited to changed information, for example, in embodiments in which only changed information will be included in a transaction record to be sent to the server and/or saved on the gateway.

Following the step 606 is a step 608, where at least changed information may be added to transaction record information. For example, in preparation for sending a transaction record to the server, the transaction record may be generated iteratively as each communication is received, such that the transaction record information is augmented or otherwise modified each time a new communication is received at the gateway. Some form of temporary data structure may be used to iteratively build the transaction record. Only changed information from the communication may be added to the transaction record information in embodiments in which only changed information are included in the transaction record.

Following the step 608 is a test step 610 where it is determined whether it is a scheduled time to send a transaction record to the server for the gateway. If not, then control transfers back to the step 602 to await a next communication from a device. Otherwise, control transfers from the step 610 to a step 612. In embodiments in which a transmission schedule is not employed, the step 612 is reached directly from the step 608. At the step 612, a block transmission request may be sent to the server, as described elsewhere herein. Following the step 612 is a step 614 where a one-way hash of an immediately preceding transaction record may be received. Following the step 614 is a step 616, where a one-way hash of the current transaction may be generated. Following the step 616 is a step 618 where a transaction record of the current transaction may be sent to the server. The transaction record may be in any of a variety of forms, including any of those described herein. Following the step 618 is a step 620 where the transaction record is stored, for example, as part of a transaction chain, on the server, on a gateway and/or elsewhere.

In some embodiments, rather than send a request at the step 612 and receive the one-way hash at the step 614 before sending the transaction record in the step 618, a gateway may simply submit the transaction record. In such embodiments, transaction record updates may be received by a gateway each time a transmission record is submitted to the server by any gateway such that each gateway has a one-way hash of the immediately preceding transaction to use as part of creating the current transaction record.

Figure 7:
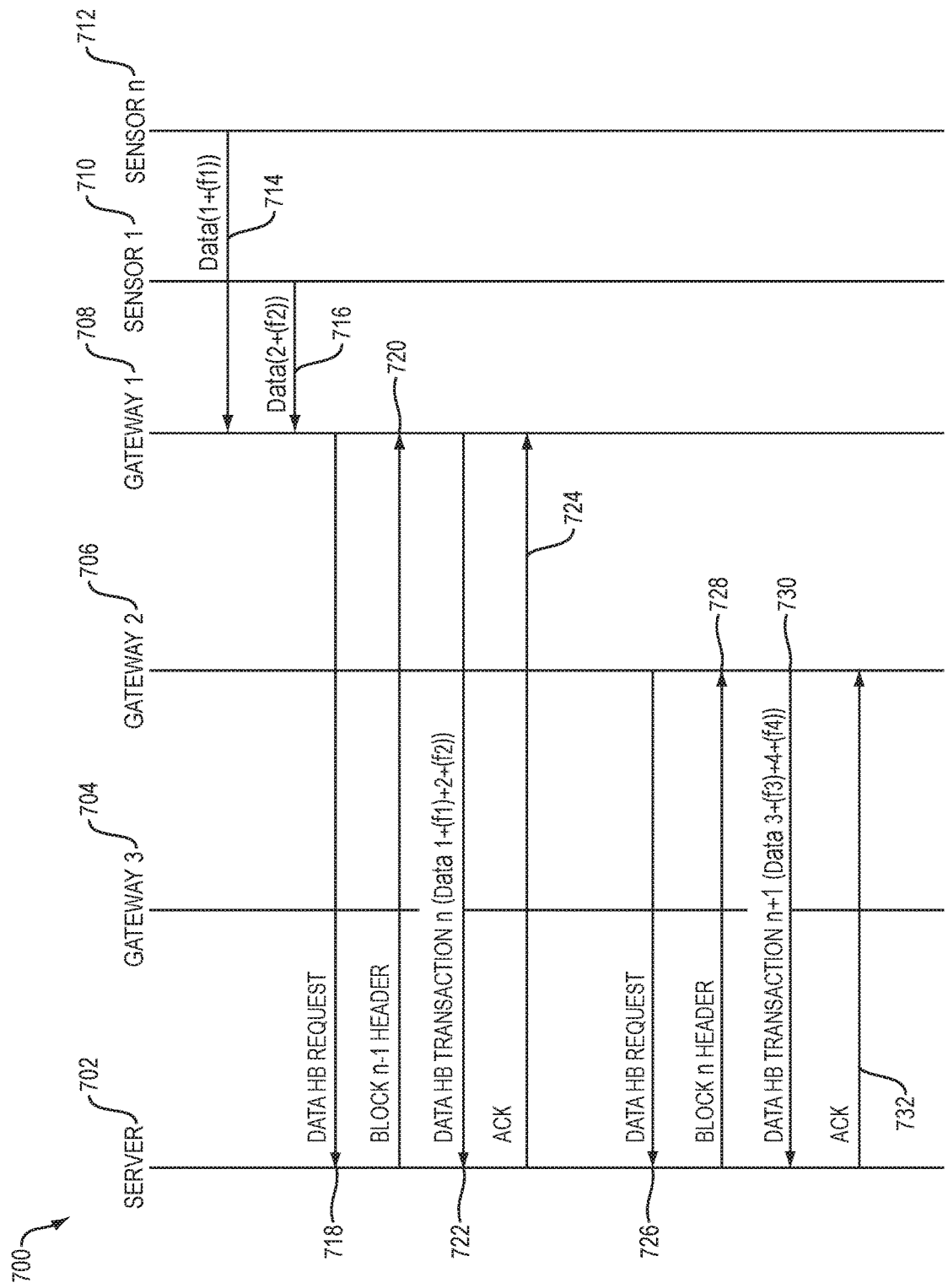
FIG. 7 is a sequence diagram illustrating a sequence of communications between sensors, gateways and a server to efficiently and reliably tracking device information on the network according to embodiments of the system described herein.

FIG. 7 is a sequence diagram illustrating a sequence 700 of communications between data sources/sensors 710, 712, gateways 704, 706, 708 and a server 702 (e.g., of a network cloud) to efficiently and reliably tracking device information on a network according to some embodiments of the invention. Other embodiments of a sequence of communications between sensors, gateways and a network cloud to efficiently and reliably tracking device information on a network, for example, variations of the sequence 700, are possible and are intended to fall within the scope of the system described herein. The sequence 700 may be implemented using components of the system 100 described elsewhere herein.

A communication 714, including public data "1" and private data "(f1)" is transmitted from the sensor 712 to the gateway 710, and then a communication 716, including public data "2" and private data "(f2)" is transmitted from the sensor 710 to the gateway 708. At some later point in time, for example during an allotted time slot as described herein, the gateway 708 transmits a transaction transmission request 718, e.g., a Data Heartbeat (HB) Request to the server 702. In response, the server 702 sends a one-way hash 720 of an immediately preceding transaction record, n−1, e.g., from a header of a transaction block n−1, to the gateway 708. The gateway 708 then sends a transaction record 722, e.g., Data HB transaction n, including the public and private information from the communications 714, 716, and the server 702 responds with an acknowledgment (ACK) 724. The gateway 706 then transmits a transaction transmission request 726, e.g., a Data Heartbeat (HB) Request to the server 702, for example, during an allotted time slot for the gateway 706. In response, the server 702 sends a one-way hash 728 of an immediately preceding transaction record, n (i.e., transaction record 722), e.g., from a header of a transaction block n, to the gateway 706. The gateway 706 then sends a transaction record 730, e.g., Data HB transaction n+1, including public information "3" and "4" and private information "(f3)" and "(f4)" received, for example, in communications from one or more sensors coupled to the gateway 706, and the server 702 responds with an acknowledgment (ACK) 732.

The four communications exchanged as illustrated in FIG. 7 as part of transmitting transaction records from gateways to servers, described in more detail in relation to FIG. 6, make efficient use of network resources, and may be considered to create a minimum amount of communication overhead necessary to properly implement a transaction chain (e.g., blockchain). This efficient use of resources is in contrast, for example, to alternative embodiments in which every gateway receives an update every time a gateway submits a transaction record to the server. Considering that the device information of the transaction record is transmitted, and an acknowledgement received, in any scheme in which a transaction information is recorded, the only additional communication overhead per the four-communication sequence described herein is: the sending of the transaction transmission request, the receipt of the one-way hash of the previous transaction; and the inclusion of the one-way hash of the transaction in the transaction record. That is, for n transactions between gateways and a server of a system, the message overhead (compared to a system not using a transaction chain) is only 2*n messages.

For example, for a relatively small system having 30 sensors per gateway, assuming: 12 bytes of information are produced per sensor, a one-way hash of a transaction has a length of 256 bits (32 bytes), and a communication header for any communication has a length of 64 bytes, the number of bytes consumed for each submission of a transaction record from a gateway, and the communication overhead associated therewith, may be calculated as follows:

Transaction transmission request=communication header=64 Bytes
Response from server=communication header+one-way hash=64+32=96 Bytes
Transaction record=communication header+one-way hash+device information=64+32+12*30=456 Bytes.
ACK message=communication header=64 Byte.
Total transaction record bytes=64+96+456+64=680 Bytes
Total transaction record overhead=transaction transmission request+response from server+one-way hash of the transaction record=192 Bytes, which is approximately 25% of the total transaction record bytes.

The percentage of overhead reduces as a number of sensors grows. For example, if there are 500 sensors, like within the MYNXG TracoBin® System available from MyOmega, the overhead percentage may be smaller than 3%.

As noted elsewhere herein, the transmission of transaction records from gateways to a server may be scheduled using predetermined time slots within as cycle, which will now be described in more detail. FIG. 8 is a diagram illustrating an example of the use of time slots within a cycle to schedule the transmission of transaction records to a server. Other embodiments of the use of time slots within a cycle to schedule the transmission of transaction records to a server, for example, the use shown in FIG. 8, are possible and are intended to fall within the scope of the system described herein. The transmission schedule may be defined, stored and/or under control of the server to which record transactions are transmitted, and may be implemented using any of a variety of technologies, including a cloud-based scheduler.

A cycle having a cycle time 802 may be configured to include a plurality of time slots 806, where, in some embodiments, each time slot is defined to have a same duration of slot time 804. The slot time 804 may be determined based on an estimated cumulative time it takes to perform the following for a given gateway:
1. Transmit the communications necessary to complete a transaction record transmission between the gateway, for example the communications 718, 720, 722, 724 described above in relation to FIG. 7 and FIG. 6;
2. Compute a one-way hash of the transaction record and to perform any other necessary encryption by the gateway as described in more detail elsewhere herein;
3. Store the transaction record on the server or elsewhere in a network cloud; and
4. Prepare the transaction header for the transaction record.

In some embodiments, the slot time 804 may be determined based on the longest estimated cumulative time it takes to perform the foregoing for any given gateway, for example, taking into consideration the computational power of the gateway and the number of sensors coupled thereto. By determining slot time based on the longest estimated time, it may be ensured that the time slot is of sufficient duration for all gateways.

In some embodiments, the system (e.g., the server and each gateway) may be configured to ensure that any user requests (e.g., from UE) made to the server may be completed (e.g., the response computed and transmitted) within one slot time. Such a user request may request all of the information within the transaction chain to which the user is entitled (e.g., all public information and only private information to which the user is entitled), or a portion thereof. In such embodiments, the cycle time 802 may be determined based on: the determined duration of the time slot 804; the number of gateways that will transmit record transactions to the server; and an estimated rate at which user requests will be submitted to the server, i.e., how many user requests can be expected within a given window of time. Additional buffer time may be factored in to ensure that all gateways of a system may be accommodated within the cycle time 802. The cycle time 802 may be expressed as:

Cycle time≥Slot time×(#Gateways+estimated #user requests per unit time+buffer x).

Figure 8:
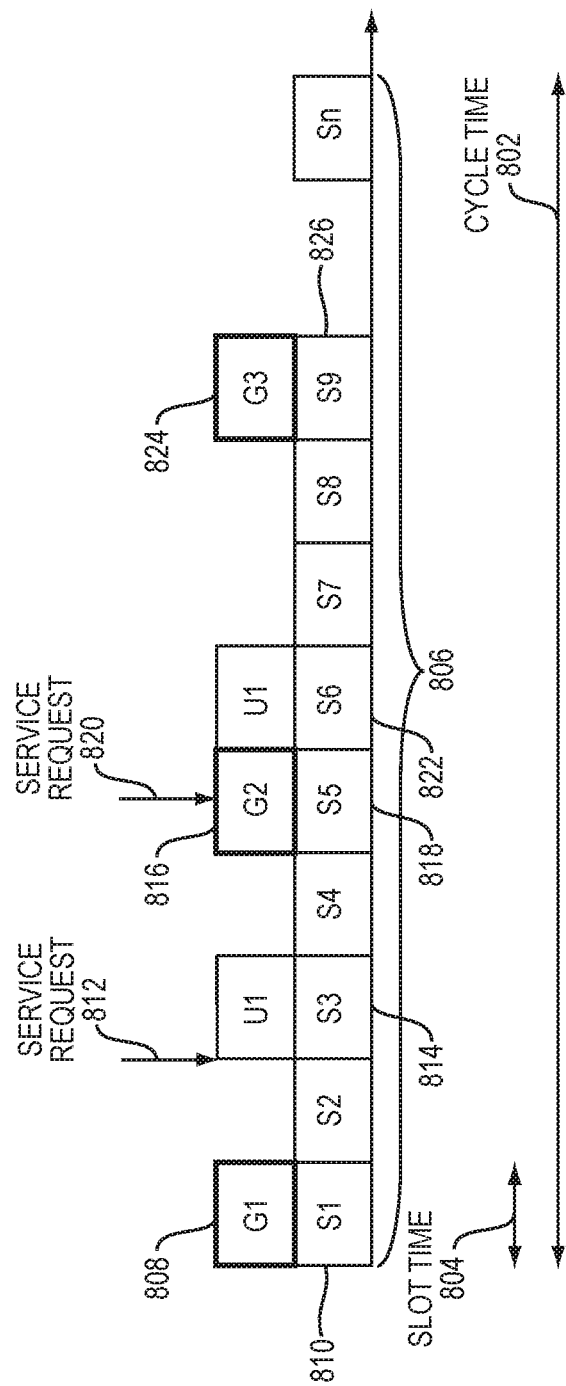
FIG. 8 is a diagram illustrating an example of the use of time slots within a cycle to schedule the transmission of transaction records to a server according to embodiments of the system described herein.

For example, referring to FIG. 8, during cycle time 802, gateway 808 may be serviced by the server during a time slot 810 (S1), a user request 812 may be serviced during a time slot 814 (S3), a gateway 816 may be serviced during a time slot 818 (S5), a user request 820 may be serviced during a time slot 822 (S6) and a gateway 824 may be serviced during a time slot 826 (S9). The user request 820 may be processed as part of the time slot 822 as opposed to the time slot 818 because, when the user request 820 arrived, the server is already servicing the gateway 816, and the server may be configured to complete such servicing before processing a next user request. It should be appreciated that not all of the time slots 806 were used as part of the cycle time 802. This may result from a conservative estimate of the user request rate and a conservative buffer x to ensure there are adequate time slots to accommodate all user requests and perhaps other unforeseeable delays. In the case of the example of FIG. 8, less than the maximum estimated user requests were received. It should also be appreciated that, in some embodiments, the time slots scheduled for gateways are spaced within the cycle to help ensure there is enough time to accommodate user requests between servicing gateways.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The system described herein may be implemented with any type of electronic screen capable of being actuated by a touch screen, electromagnetic or other pen.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A system that tracks information about a plurality of devices in a network, comprising:
   a gateway that receives a plurality of communications that include information indicating a state of one of the plurality of devices and that groups the information from two or more of the plurality of communications into a first transaction record that includes a hash of an immediately preceding transaction record for the network;
   a server that receives the first transaction record from the first gateway; and
   a second gateway, different from the first gateway, that submits a transaction record transmission request to the server and receives from the server a hash of the first transaction record in response thereto, the hash of the first transaction record being provided to the second gateway only in response to the second gateway providing the transaction record transmission request to the server.

2. The system according to claim 1, wherein the transaction record is a transaction block of a blockchain.

3. The system according to claim 1, wherein grouping the information includes grouping information only from communications of the plurality of communications that represent a change in state of one of the plurality of devices.

4. The system according to claim 1, wherein transaction records are sent to the server according to a predefined schedule.

5. The system according to claim 4, wherein information regarding the predefined schedule is included in the transaction record sent to the server.

6. The system according to claim 4, wherein the first gateway and the second gateway each send one or more transaction records during a predetermined time slot within a given cycle.

7. The system according to claim 6, wherein a schedule defines the cycle and a plurality of time slots within the cycle for the plurality of gateways.

8. The system according to claim 6, wherein, for each time slot, only information indicating a changed state of one of the plurality of devices is stored on the server.

9. The system according to claim 8, wherein, once per cycle, information included in the one or more transaction records sent by the gateways is recorded at the server, independent of whether the information represents a changed state of a device.

10. The system according to claim 1, wherein the first transaction record includes one or more portions of information, each portion of information corresponding to information included in one of the communications received at the first gateway indicating the state of one of the plurality of devices and wherein a first portion of the one or more portions includes information encrypted with a security credential of the one of the plurality of devices.

11. The system according to claim 10, wherein the first portion includes information that is not encrypted.

12. The system according to claim 1, wherein the gateway includes a trusted platform module to encrypt at least a portion of the transaction record.

13. The system according to claim 1, wherein the first transaction record has a record body and a record header, the record body including the grouped information, and the record header including the hash of the immediately preceding transaction record.

14. The system according to claim 1, wherein the first transaction record is stored on the gateway.

15. The system according to claim 1, wherein changes in state to one or more devices on the network are determined by submitting a request to the server for one or more transaction records of the record chain.

16. The system according to claim 1, wherein the plurality of communications are received on secure communication channels and the transaction record is sent on secure communication channels.

17. The system according to claim 1, wherein the transaction record is sent in a communication in which the transaction record is encrypted using TLS.

18. The system according to claim 1, wherein the server stores the transaction record as part of a record chain on one or more storage media.

19. The system according to claim 18, wherein the record chain represents a transaction register of all transactions corresponding to the gateways.

20. The system according to claim 1 wherein at least one of the transaction record is used to implement a smart contract.

* * * * *